United States Patent [19]
Imamura et al.

[11] 3,724,740
[45] Apr. 3, 1973

[54] ASSEMBLING DEVICE

[75] Inventors: Hitoshi Imamura, Kanagawa; Keiji Katakura, Tokyo, both of Japan

[73] Assignee: Tokyo Shibaura Electric Co., Ltd., Kawasaki-shi, Japan

[22] Filed: May 5, 1972

[21] Appl. No.: 250,507

Related U.S. Application Data

[63] Continuation of Ser. No. 41,185, May 28, 1970, abandoned.

[30] Foreign Application Priority Data

May 31, 1969 Japan ................................44/42060

[52] U.S. Cl. .....................228/6, 29/25.19, 29/25.2, 228/44
[51] Int. Cl. ............................B23k 1/00, B23k 5/00
[58] Field of Search .......228/4, 6, 44; 29/25.19, 25.2

[56] References Cited

UNITED STATES PATENTS

| | | | |
|---|---|---|---|
| 3,522,647 | 8/1970 | Holcomb et al. | 29/471.1 X |
| 3,533,153 | 10/1970 | Melill et al. | 29/471.1 X |

*Primary Examiner*—J. Spencer Overholser
*Assistant Examiner*—Richard Bernard Lazarus
*Attorney*—Kemon, Palmer & Estabrook

[57] ABSTRACT

A device for accurately fixing an elastic support member having a certain length to a base body which comprises means for causing one end of an elastic support member to contact the base body, means for contracting the other end of the elastic member under pressure toward the base body without allowing the other end thereof to contact the base body and means for fixing that part of the elastic member which contacts the base body, whereby the elastic member is accurately bonded to the base body in the position for said base body to be attached to another base body by means of the elastic support member.

10 Claims, 13 Drawing Figures

PATENTED APR 3 1973 3,724,740

ASSEMBLING DEVICE

This is a continuation of application Ser. No. 41,185 filed May 28, 1970 now abandoned.

BACKGROUND OF THE INVENTION

The present invention relates to an assembling device for accurately fixing an elastic member to a base body and more particularly to a device for accurately attaching to a frame which is to be fitted with the shadow mask of a color television cathode ray tube an elastic support member used in securely fixing the assembled shadow mask and frame to the cathode ray tube panel.

There will now be described a shadow mask type color television cathode ray tube widely disseminated to households in general. As seen from FIG. 1, a frame 1 to which there is welded a shadow mask 2 of thin steel sheet perforated with numerous small apertures, namely, a mask-frame assembly (hereinafter referred to as "a mask assembly") is fitted to the inside of a dish-shaped panel 3 constituting part of a cathode ray tube envelope coaxially with the panel at a prescribed space from the panel, that is, with a predetermined positional relationship therewith.

Figure 1:
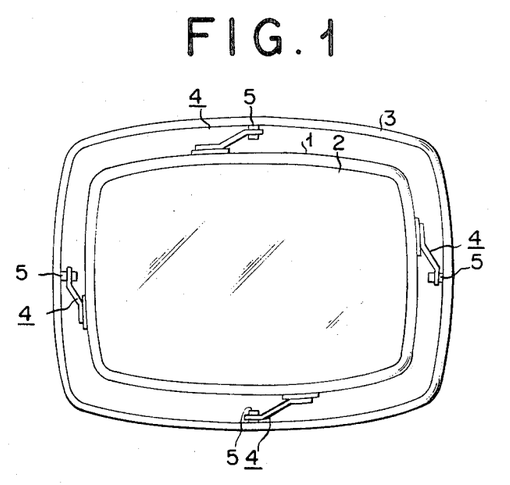
FIG. 1 is a plan view of a color television cathode ray tube panel supporting a mask assembly, as viewed from the side of an electron gun assembly.

The frame 1 assumes substantially the same outline as the panel 3. To fix the mask assembly to the inner wall of the panel 3, there is securely attached one end of each elastic support member 4 having a prescribed length to the four sides of the frame 1. The other end of the elastic support member 4 is perforated with an aperture. There is fitted into the aperture a pin or stop member 5 embedded in the inner wall of the panel 3 so as to set the mask assembly thereon. Under such condition, the elastic support member 4 is in a compressed state.

For an angular cathode ray tube, there are provided three or four stop members 5 at the central part of the respective inner walls of the panel 3. For a round cathode ray tube, there are radially arranged three stop members 5 at an equal space in a peripheral direction. The elastic support member 4 is fitted to the frame in such positional relationship that each of the stop members 5 fully engages the aforesaid aperture.

Figure 2:
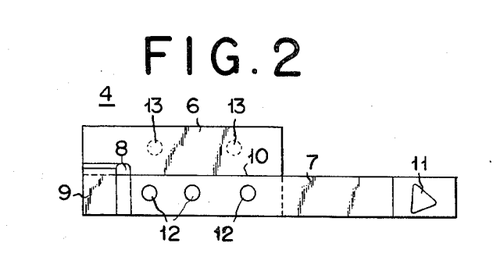
FIG. 2 is an elevation of an elastic support member for fitting the mask assembly to the panel.
Figure 3:
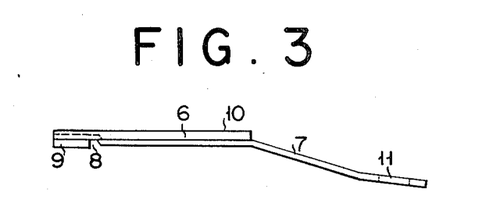
FIG. 3 is a top view of the elastic support member of FIG. 2.

The elastic support member 4 consists, as shown in FIGS. 2 and 3, of a metal clip section 6 performing a bimetallic action and metal holder section 7 presenting an elastic action. Further, the clip section 6 is separated at the bottom into a short portion 9 and a long portion 10 by means of a notch 8. One end of the holder section 7 is clipped by these two portions 9 and 10. The other end of the holder section 7 is perforated with an aperture 11, into which there is fitted the stop member 5 embedded in the wall of the panel 3. As shown in FIG. 3, the end part of the holder section 7 is inclined with respect to the horizontal plane of the clip section 6 so as to perform an elastic action. Referring to FIG. 2, small solid line circles 12 denote the points at which the clip section 6 and holder section 7 are spot welded together, and small dotted line circles 13 represent the prescribed points of the frame walls at which the clip section 6 is spot welded.

FIG. 2A shows only an example of the elastic support member 4. It will be apparent that the support member 4 may assume many other shapes. Where fitted to the long and short sides of a rectangular frame supporting a rectangular cathode ray tube, the support members may have different forms due to such shape of the frame.

The conventional method of fixing the mask assembly to the inside of the side walls of the panel comprised the steps of fitting a desired number of clips to the prescribed points on the side walls of the frame, welding a shadow mask to the frame, fitting the mask assembly to the inside of the side walls of the panel using spacers having a specified thickness, causing one end of each holder to be clamped by the clip means, fitting the stop member embedded inside of the side walls of the panel into the aperture bored at the other end of the holder so as to temporarily arrest said holder and finally welding together the clip and holder. These operations were all manually conducted, and the prescribed positional relationship between the mask assembly and the panel was only determined by the trial and error aligning method. Due to the relatively complicated form of the frame and panel, however, welding of the holder to the clip, particularly performed by hand, most likely caused the welding points to be displaced, leading to the inaccurate relative positions of the mask assembly and the panel. There is always required a rigid adjustment of said relative positions. Otherwise, electron beams would not impinge on the specified fluorescent dots, that is, causing the so-called mislanding of electron beams, and in consequence the poor purity of color and failure of desired color pictures to be presented.

Further, manual operation often led to the occurrence of damage to the glass panel 3 and the deformation of the thin shadow mask. In addition, there were demanded of operators a great deal of time and work and advanced skill.

The above-mentioned facts also hold true with a recently marketed chromatron type color television cathode ray tube. This chromatron type involves, in place of a shadow mask, a large number of fine deflection grids stretched across the frame in the same direction. Also in this case, it is necessary rigidly to define the prescribed position of the deflection grid-frame assembly relative to the panel.

SUMMARY OF THE INVENTION

It is accordingly the object of the present invention to provide an assembling device capable of fixing with high precision an elastic support member to a base body.

The assembling device of the present invention is considerably adapted to fix to a base body such as a frame supporting a shadow mask or deflection grids an elastic support member used in attaching said frame to the inside of cathode ray tube panel.

The present invention provides an assembling device which comprises means for setting a base body in place, means for causing one end of an elastic support member to contact the base body mounted on said setting means, means for contracting the other end of said elastic member under pressure toward the base body, and means for fixing that part of the elastic body which contacts the base body.

The present invention is characterized in that one end of a support member is made to contact a frame and said one end of the support member is fixed to the frame with the other end of the support member contracted under pressure, that is, in exactly the same alignment as is required for the fitting of the mask assembly to the panel, thereby enabling the support member to be securely attached to the frame in an accurately desired position.

DESCRIPTION OF THE PREFERRED EMBODIMENT

Figure 4:
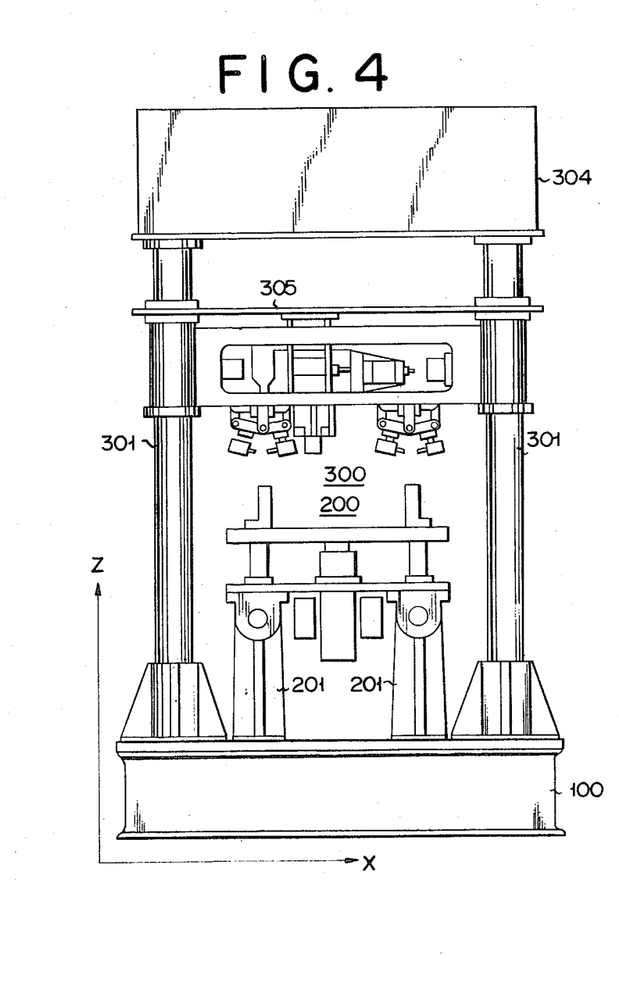
FIG. 4 is a schematic elevation of an assembling device according to an embodiment of the present invention.
Figure 5:
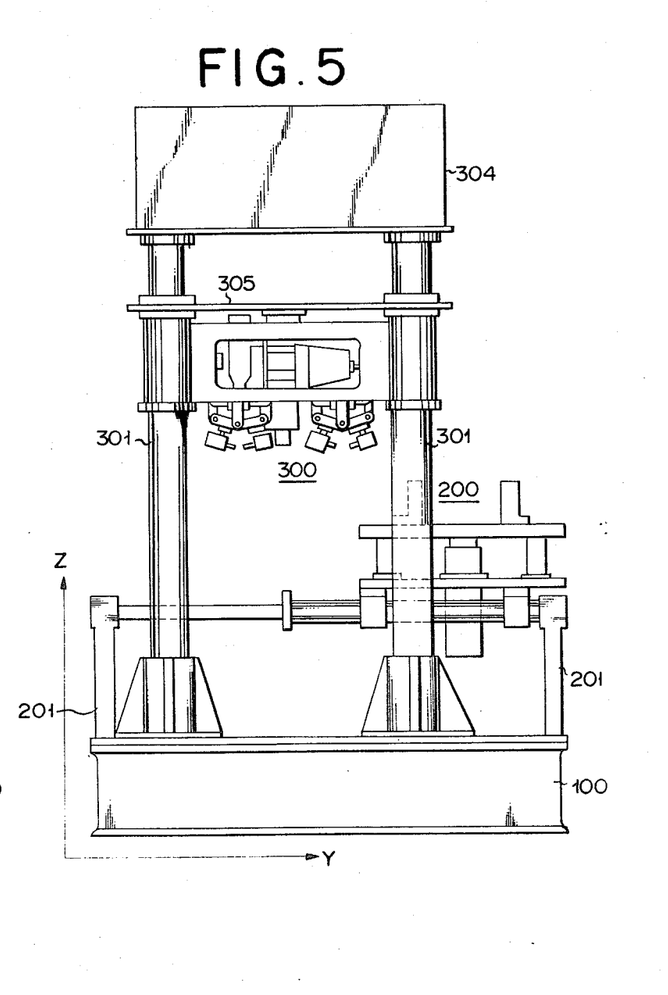
FIG. 5 is a schematic side view of FIG. 4.

Reference is made to FIGS. 4 and 5 schematically showing an assembling device embodying the present invention for welding to a frame or base body which is to be fitted with a shadow mask an elastic support member used in securely mounting a mask assembly on a color television cathode ray tube panel. The assembling device comprises a support member setting means 200 supported by four brackets 201 mounted on a fixed stand 100 and provided with the later described means for setting a base member in place and holding the support member, a welding means 300 supported by four pillars 301 so as to finally weld the support member to a base body and a control means (not shown) for controlling the operation of the support member setting and fixing means. This control means is installed at a separate place from that where the indicated assembling device is set up.

Figure 6:
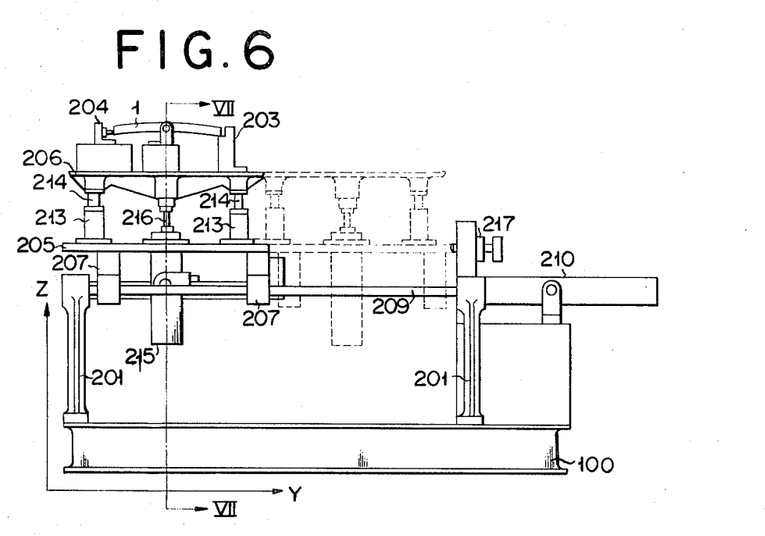
FIG. 6 is a side view of a frame setting means involved in an assembling device according to said embodiment.
Figure 7:
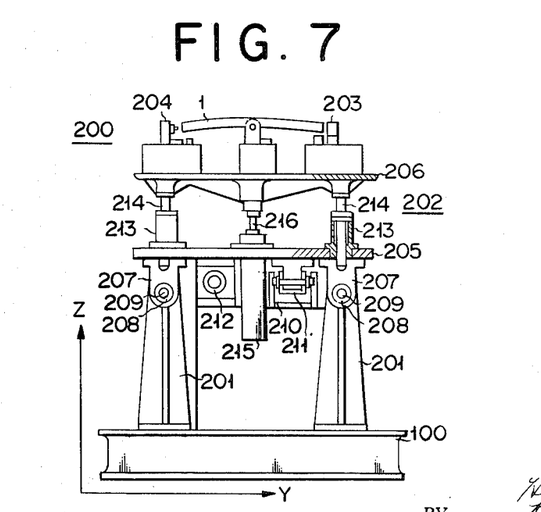
FIG. 7 is a schematic elevation on line VII—VII of FIG. 6.

As seen from FIGS. 6 and 7, the support member setting means 200 comprises a movable table 202, a base body setting means mounted on the movable table 202 so as to set the frame or base body 1 in place, and a support member holding means 204 for holding an elastic support member 4 and properly positioning said support member 4 with respect to the base body 1 set on the base body setting means 203. Further, the movable table 202 consists of a first and second table 205 and 206. To four corners on the underside of the first table 205 are fixed four brackets 207 having a slide bearing 208 disposed therein. Across those of the aforesaid four brackets 201 which constitute a pair separated from each other in the direction of Y and disposed parallel in the direction of Z (FIG. 6) there is set each of two parallel guide shafts 209. Each of the two parallel shafts 209 extending in the direction of Y penetrates the slide bearing 208 of each of the aforesaid pairs of brackets 201 fitted to the underside of the first table 205 so as to support the first table 205. The length of the first table 205 in the direction of Y is made sufficiently shorter than that of the guide shaft 209 to allow the table 205 to slide along it. To this end, there is connected an air cylinder 210 to a bracket 211 fitted to the underside of the first table 205. To control the moving speed of the first table 205, there may, if required, be provided an oil cylinder 212 on its underside by means of another bracket, because the air cylinder 210 fails to adjust said speed minutely.

At four corners on the surface of the first table 205 are disposed four bearings 213, into which there are fitted four shafts 214 respectively which are set at four corners of the second table 206. The shaft 216 of an air cylinder 215 fixed at the central part of the first table 205 in a manner to penetrate it is connected to the central part of the underside of the second table 206.

The operation of the air cylinder 210 causes the first table 205 to move along the guide shaft 209 in the direction of Y shown in FIG. 6 until the end of said table 205 contacts a stopper 217. On the other hand, the operation of the air cylinder 215 allows the second table 206 to be shifted over the first table 205 in the direction of Z shown in FIG. 6. These tables 205 and 206 can of course move backward according to the operation of the air cylinders 210 and 215.

The base body setting means 203 and means 204 for holding the elastic support member are set on the second table 206. The base body setting means 203 has four frame stands 218 (FIG. 8) fixed on the second table so as to face the corners of the frame or base body 1. The frame stand 218 is provided at the upper end with a stepped portion 219 to match the form of the frame corner. The four frame stands are intended to hold the frame 1 to which there is later to be welded the support member on the second table 206 parallel therewith. These frame stands 218 are so positioned as to allow for a certain range of tolerances for the frame size.

On one of the two longer sides of the frame 1 to be set on the frame stands 218, there may, if necessary, be provided for the reason given later frame keep rods 220 at symmetrical positions with respect to the shorter axis (line X—X of FIG. 8) of the frame 1. The keep rods 220 are each screwed into a support stand 221 fixed on the second table 206. The length of the projecting portion of the keep rod 220 is adjusted by means of a nut 222.

Figure 9:
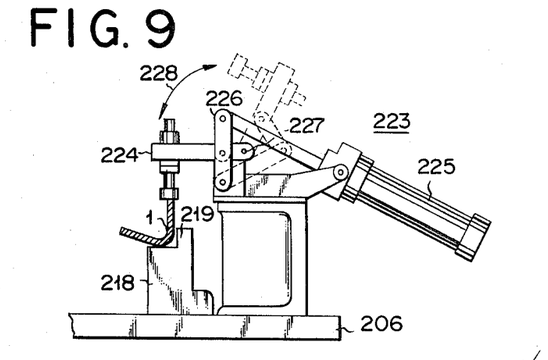
FIG. 9 is a schematic side view of a frame keep means involved in the assembling device of the invention.

Outside each of the frame stands 218 supporting the frame corners is provided a frame keeping means 223. These frame keeping means 223 are used in pressing the corners of the frame mounted on the frame stands 218 so as to prevent the frame from being pushed up. The frame keeping means 223 is a known air toggle clamp fixed on the second table 206 as shown in FIG. 9. The air toggle clamp 223 comprises a head section 224 for depressing the edge portion of the frame corner, an air cylinder 225 for controlling the movement of the head 224 and a toggle actuating mechanism 226 for transmitting the action of the air cylinder 225 to the head section 224. The head 224 is allowed to swing about the fulcrum 227 back and forth in the direction indicated by the arrow 228 by the air cylinder 225. The dotted lines of FIG. 9 denote the inoperative state of the frame keeping means 223. This means 223 may consist of any other type than the aforesaid air toggle clamp.

According to the foregoing embodiment of the present invention, the second table 206 on which there is set the frame 1 is made to move toward the support member fixing means 300 so as to vary the relative positions of the means 200 and 300 for setting and fixing the support member 4 respectively. However, instead of mounting the air toggle clamp 223 on the second table 206, there may be fitted to the underside of the stand supporting the supporting member fixing means 300 four fixed heads which face the frame corners and contact the edge portions thereof when the second table 206 is raised.

The frame 1 to which the elastic support member 4 is to be fixed is set on the frame stands 218 with one of its longer sides contacting the frame keep rods 220. In this case, the frame stand 218 supports the frame corner from below and the frame keeping means 223 pushes down the edge portion of the frame corner from above, thereby enabling the frame to be securely set in place.

Figure 8:
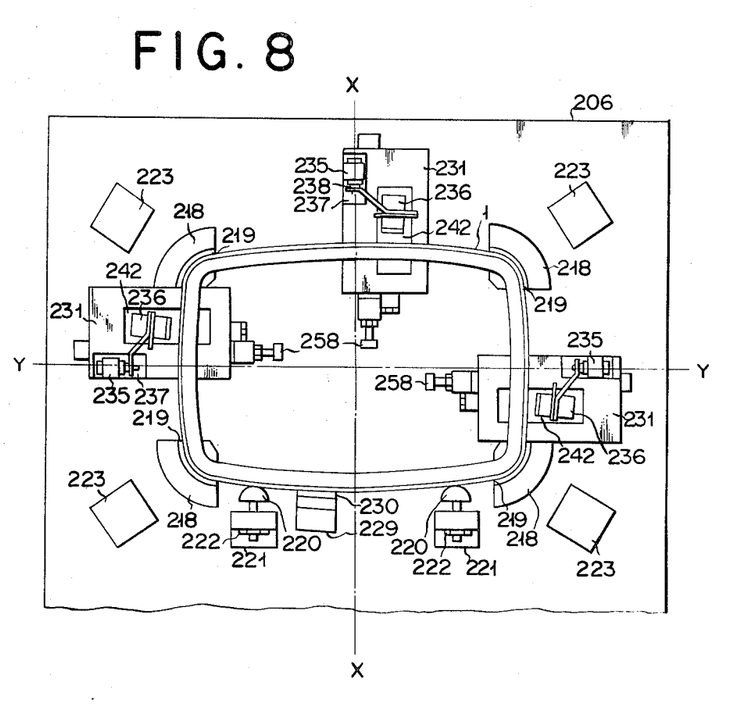
FIG. 8 is a schematic view of the main part of said frame setting means.

The support member holding means 204 comprises one clip chuck 229 and three support member chucks 231 shown in FIG. 8. The clip chuck 229 is positioned on the second table 206 intermediate between the aforesaid paired frame keep rods 220 and two of the three support chucks 231 are disposed on both shorter sides of the frame 1 set on the frame stands 218 and the remaining one of said three support chucks 231 is mounted on that longer side of the second table 206 on which there is not provided said clip chuck 229. The clip chuck 229 is intended to fit a single separate clip 6 not coupled with the holder section 7 shown in FIG. 2 to the frame for the reason given below. The clip chuck 229 is of a block type having a groove 230 formed at the top so as to allow the clip 6 to be inserted thereinto. If required as described later, said clip chuck 229 may of course be replaced by the support member chuck 231.

Figure 10:
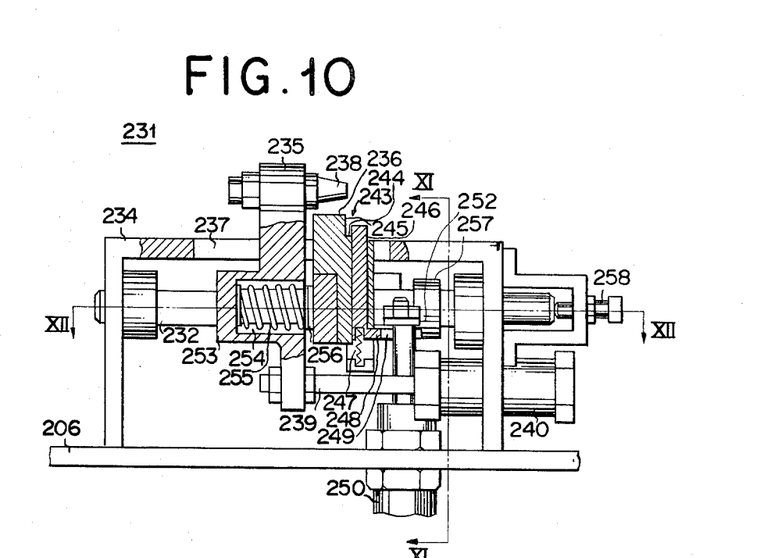
FIG. 10 is a schematic side view, partly broken away, of a support member chuck involved in the assembling device of the invention.
Figure 11:
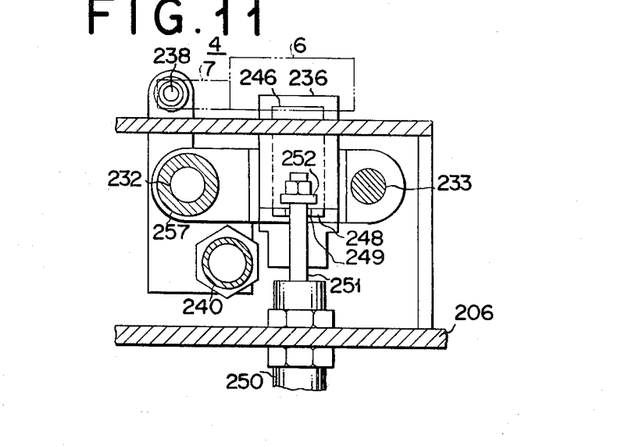
FIG. 11 is a longitudinal sectional view on line XI—XI of FIG. 10.
Figure 12:
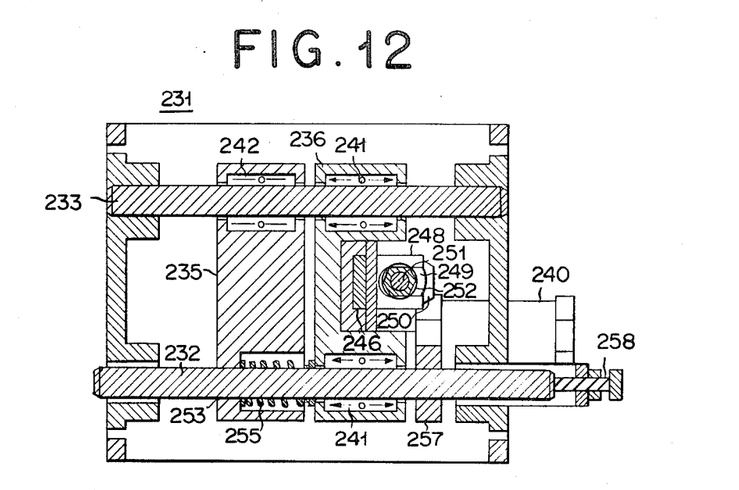
FIG. 12 is a cross sectional view on line XII—XII of FIG. 10.

As shown in FIGS. 10 to 12, the support chuck 231 is provided with a movable shaft 232 extending along the longer axis (line Y—Y) or shorter axis (line X—X) of the frame 1 and so disposed as to freely move in the casing 234 and a guide shaft 233 fixed thereto. The movable shaft 232 and guide shaft 233 are arranged along the second table 206 in parallel and spaced relationship. These shafts 232 and 233 are fitted with a carrier member 235 and holder member 236. Part of the carrier member 235 projects through a rectangular aperture 237 perforated in the top surface of the casing 234. At said projecting end portion is provided for engagement with one end of the elastic support member 4 a dummy pin 238 having the shape of a frustum or truncated cone equal to that assumed by a pin 5 fitted to the inside of the side walls of the panel 3 in a manner to face the frame 1 to be set on the frame stands 218. The carrier member 235 is connected at the lower end to the shaft 239 of an air cylinder 240. The carrier member 235 is fixed to the movable shaft 232, so that when the movable shaft 232 travels, the carrier member 235 is allowed to slide along the guide shaft 233 penetrating therethrough by the action of the air cylinder. The holder member 236 is positioned nearer to the frame 1 than the carrier member 235 and so fitted as to slide along the movable shaft 232 and guide shaft 233 which pass through the holder member 236. To assure the smooth sliding of the carrier member 235 and holder member 236, there are provided a slide ball bearing 241 and ball bearing 242 at the part of the holder member 236 contacting the movable shaft 232 and guide shaft 233 and at the part of the carrier member 235 contacting the guide shaft 233. The holder member 236 projects at the center through the rectangular aperture bored in the top surface of the casing 234 and comprises a holding means 243 for holding the clip section 6 of the elastic support member 4 by means of a groove 244 formed in said holding means 243. This groove is defined by the stepped portion 245 formed at the upper part of the holder member 236 and a slide plate 246 disposed between the stepped portion 245 and side wall of the holder member 236. The slide plate is pushed up at the bottom end by a spring 247. The lower end of the slide plate 246 constitutes a bent section 248 formed into an L-shape and provided with a U-shaped notch 249. Into the notch 249 is inserted the shaft 251 of an air cylinder 250 having a smaller diameter than the width of the notch 249. At the end of the shaft 251 is disposed a keep plate 252 having a larger diameter than the width of the notch 249. Accordingly, the operation of the air cylinder 250 depresses the slide plate 246 to release the clip section.

The dummy pin 238 positioned at the upper part of the carrier member 235 and the holding means 243 of the holder member 236 are spaced from each other widely enough to allow the aperture 11 at the end of the holder section 7 of the elastic support member 4 to engage the dummy pin 238 when the clip section 6 of the elastic support member 4 is fitted to the holder means 243.

On one side of the carrier member 235 is formed a depression 254 around the movable shaft 232 and adjacent to that part of the carrier member 235 which is fixed to the movable shaft 232. In the depression 254 around the movable shaft 232 is disposed a coil spring 255, one end of which faces the holder member 236 through a washer 256. On one side of the movable shaft 232 opposite to that side of the holder member 236 which faces the carrier member 235 is fixed an annular collar 257. The space between the collar 257 and holder member 236 is so defined that when the clip section 6 of the elastic support member 4 held by the holder member 236 contacts the frame 1 set on the frame stands 218, the collar 257 just touches the holder member 236 or is only slightly set apart therefrom.

Outside that end of the movable shaft 232 at which there is positioned the collar 257 is provided a screw 258 for controlling the sliding of the movable shaft 232. This control screw 258 is so designed to have the length of its projecting portion adjusted. The travel of the movable shaft 232 is regulated by the adjusted length of said projecting portion.

The support member chuck 231 arranged as previously described is operated in the following manner. The pulling action of the air cylinder 240 causes the movable shaft 232 to which there is fixed the carrier member 235 to advance toward the control screw 258, namely, toward the frame 1 set on the frame stands 218. The advance of the movable shaft 232 makes the carrier member 235 slide forward along the guide shaft 233. As the carrier member 235 travels, the holder member 236 facing the carrier member 235 through the coil spring 255 also slides forward along the guide shaft 233. The movement of the carrier member 235 stops when the end of the movable shaft 232 contacts the end of the control screw 258. (FIGS. 10 to 12) The reverse motion or retraction of the movable shaft 232 and carrier member 235 is effected by the backward action of the air cylinder 240 and the withdrawal of the holder member 236 is carried out by engagement with the collar 257 fixed to the movable shaft 232.

When the air cylinder 240 is in inoperative state the slide plate 246 mounted on the holder member 236 is pushed up by the spring 247 to define in the holding means 243 of the holder member 236 the groove 244 into which there is to be fitted the clip section 6 of the elastic support member 4. When, at the end of the travel of the movable shaft 232, the clip section 6 of the elastic support member 4 is fully welded to the frame 1, then the slide plate 246 is pulled down by the action of the air cylinder 250 to release the support member 4 permanently fixed to the frame 1 from the holder member 236.

The support member chuck 231 causes the clip section 6 of the elastic support member 4 to be fitted into the groove 245 formed in the holding means 243 of the holder member 236, and the aperture 11 of the holder section 7 of the support member 4 to engage the dummy pin 238 of the carrier member 235, thereafter allowing the carrier member 235 to move forward. In this case, all the members involved in the subject assembling device are kept in such positional relationship that while the contact of the clip section 6 with the side walls of the frame 1 stops the movement of the holder member 236, the carrier member 233 or movable shaft 232 is allowed to keep on travelling slightly until the end of the movable shaft 232 touches the control screw 258. The final positional relationship of the clip section 6 and holder section 7 of the elastic support member is the same as when the mask assembly is fixed to the panel 3.

The welding means 300 comprises welding gun members 302, welding gun sliding members 303 and welding transformers 304 illustrated in FIGS. 4 and 5. Referring to these figures, the welding means 300 is supported by four pillars 301 mounted on the fixed stand 100, and the welding gun members 302 and welding gun sliding members 303 are positioned below a table 305 fixed on the pillars 301.

The welding gun members 302, welding gun sliding members 303 and welding transformers 304 are respectively provided in a number of four to match the aforesaid three support member chucks and one clip chuck. The gun members 302 are fitted to the underside of the table 305 so as to allow the welded parts of the frame 1, elastic support members 4 and a separate clip set on the movable table 202 to be brought exactly between the later described electrodes of the welding gun members 302.

Figure 13:
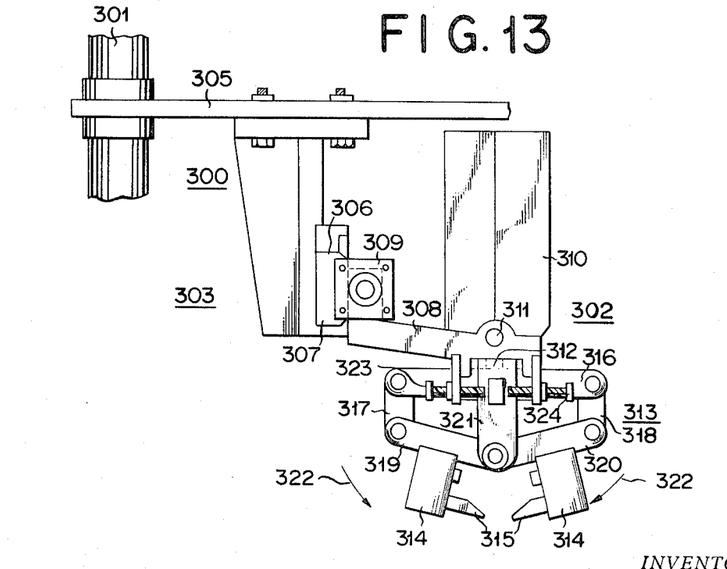
FIG. 13 is a schematic elevation of a welding means involved in the assembling device of the invention.

Referring to FIG. 13, the welding gun sliding member 303 fixed to the underside of the table 305 has a slide groove 306, with which there is engaged a slide member 307. To the slide member 307 is fitted an arm 308, to which there is attached the shaft of an air cylinder 309. The action of the cylinder 309 causes the slide member 307 to travel through the slide groove 306. The welding gun member 301 comprises an air cylinder 310 fitted to the arm 308 rotatably about the shaft 311 penetrating said arm 308, a link mechanism 313 connected to the shaft 312 of the air cylinder 310 and welding electrode sections 314 fitted to two of the arms constituting the link mechanism and each provided with an electrode 315. The link mechanism 313 comprises an arm 316 connected to the shaft 312 of the air cylinder 310, other arms 317 and 318 rotatably fitted to both ends of the first mentioned arm 316, other arms 319 and 320 rotatably fitted to the respective ends of the arms 317 and 318 and still another arm 321 to which there are rotatably attached the respective ends of the arms 319 and 320, and which is fixed to the air cylinder 310.

The welding electrode sections 314 are fixed to the arms 319 and 320 respectively. The electrodes 315 of said electrode sections 314 are closed when the arms 319 and 320 rotate in the directions indicated by the arrows 322 by the action of the air cylinder 310.

Reference numerals 323 and 324 denote threaded rods provided on the arm 308 to which there is attached the slide member 307. These threaded rods 323 and 324 are intended to adjust the inclination of the welding gun members 302. This offers practical advantage, for example, in the case where the slide walls of the frame 1 set on the movable table 202 so as to have the elastic support member fixed thereto are not perpendicular to the surface of the movable table 202 as is usually observed with the frame used in a shadow mask type color television set. The gun members 302 can be inclined in the same direction as that in which the side walls of the frame are bent with resultant better welding.

The welding transformer 304 is positioned at the upper part of the pillar 301, and electrically connected to the electrode 315 of the welding electron gun member 302, though not shown. The action of the air cylinder 309 causes the slide member 307 to slide through the slide groove 306 of the welding gun member sliding section 308 in a direction perpendicular to the paper plane of FIG. 13, thereby allowing the gun member 302 to travel across those parts shown in FIG. 2 of the clip section 6 of the elastic support member 4 which are to be welded to the frame 1.

There is also provided a control means, which is electrically connected to the setting means 200 and welding means 300 of the elastic support member 4 so as to supply control signals to their operating parts.

There will now be described the operation of the subject assembling device. To fit a shadow mask, there are provided in advance a frame 1, three elastic support members each consisting of a clip section 6 and a holder section attached thereto and a separate clip. The frame 1 is set on the frame stands 218 with that side of the frame 1 turned upward to which there is to be fitted the shadow mask. At this time, one of the longer side walls of the frame 1 is made to contact the end of each frame keep rod 220. Into the groove 244 of the holder member 236 of the support member chuck 231 is inserted the clip section 6 of the support member 4, and into the aperture 11 of the holder section 7 of the support member 4 is fitted the dummy pin 238 of the carrier member 235 so as to hold the support member 4. And into the groove 230 of the clip chuck 229 is introduced only a separate clip. This clip contacts the side wall of the frame 1 set on the frame stands 218. All the aforementioned operations are manually conducted and thereafter there is closed the start switch of the control means. The support member chuck 231 begins to be actuated and the action of the air cylinder 240 causes the carrier member 235 to advance toward the frame 1. At this time, the holder member 236, urged by the coil spring 255, also moves forward. When the clip section 6 of the support member 4 held by the holder member 236 contacts the side wall of the frame 1, the holder member 236 stops its travel. On the other hand, the carrier member 235 keeps on moving forward against the elastic force of the coil spring 255 until the end of the movable shaft 232 touches the end of the control screw 258. The support member 4 temporarily held by its chuck 231 up to this point is securely set in place when the clip section 6 of the support member 4 contacts the frame 1. Thereafter the elastic holder section 7 is gradually contracted under pressure toward the frame 1. The final positional relationship of the frame 1 and support member 4 attained by the aforesaid operation is made equal to that which is realized when the mask assembly is permanently fixed to the panel 3. The clip section 6 of the support member 4 is strongly pressed to the side wall of the frame 1 due to the elastic righting movement of the coil spring 255 and the elastic righting movement of the holder section 7 contracted under pressure. Accordingly, though the frame 1 may try to move toward that side thereof on which there is not dosposed the support member chuck 231, it will be obstructed in such movement by the frame keep rods 220. Movement of the frame 1 leads to the displacement of that part of the frame 1 to which the support member 4 is to be fixed. If, however, such displacement falls within an allowable limit, there will be need to provide the frame keep rods 220.

To prevent the frame 1 from being lifted due to shocks resulting from the contact of the clip section 6 of the support member 4 with the frame 1, the air cylinder 225 of the frame keeping means 223 is actuated at the same time as or a little earlier than said contact to cause its head 224 to keep the corner edge of the frame 1. Thus the support member 4 and a separate clip are allowed to assume an exactly desired position with respect to the frame 1.

Upon completion of the above-mentioned operations, the air cylinder 210 of the movable table 202 begins to be actuated, causing the first table 205 to travel into direction of Y until it is brought below the welding means 300, as indicated by the dotted lines of FIG. 5 when the first table 205 is brought below the support member fixing means 300 or before or after that time, the air cylinder 215 is actuated to lift the second table 206 in the direction of Z. When those parts of the frame 1, support members 4 and separate clip set on the second table 206 which are to be welded are brought between the electrodes 315 of the corresponding welding gun members 302, then the second table 206 stops rising. The air cylinder 310 of the welding means 300 is actuated to cause the electrodes 315 of a welding gun to be closed, thereby welding the clip section 6 of the support member 4 and a separate clip to the frame 1 at a pressure of, for example, 5 Kg/cm$^2$. The air cylinder 310 of the welding means 300 is actuated in a prescribed displacement of time for each welding gun member 302. This is because such welding requires a large amount of power of, for example, 200 volts and 100 amperes. If a power supply situation permits, there may of course be carried out welding at the same time.

Upon completion of a first welding, the welding gun member 302 is made to slide just a little by the action of the air cylinder 309 to the next welding point. With respect to the type of support member 4 shown in FIG. 2, welding is only required to be performed at two points for each such unit, or of course admissibly at more than two points. In such case, the gun member 302 is made to slide further after a second welding.

After the aforesaid welding cycle is brought to an end, the air cylinder 309 is actuated to bring the slide member 307 back to its original position at which the first welding was conducted. Then the air cylinder 215 of the movable table 202 is actuated to bring down the second table 206 from the welding means 300. Further, the air cylinder is actuated to cause the first table 205 to move backward and the movable table 202 to return to its original position (FIG. 5). When the movable table 202 has been fully retracted, the air cylinder 250 of the support member chuck 231 is operated to pull down the slide plate 246 against the elastic force of the coil spring 247, thereby releasing the clip section 6 of the support member 4 from the groove 244 by which it has been held up to this point. Upon the descent of the slide plate 246, the carrier member 235 is withdrawn from the frame 1 by the action of the air cylinder 240. At this time, the movable shaft 232 is retracted together with the carrier member 235, allowing the compressed coil spring 255 gradually to regain its original state. When the coil spring 255 has fully or almost fully returned, the collar 257 fitted to the movable shaft 232 engages the side wall of the holder member 236, to retract the holder member 236. The withdrawal of the holder member 236 causes the shaft 251 of the air cylinder 250 and keep plate 252 to be disengaged from the slide plate 246, which in turn is brought back to its original position by the righting movement of the coil spring 247 compressed up to this point. The carrier member 235 and other related units stop their retraction when they are brought to the state which they assume just before the air cylinder 240 is started. The withdrawal of the carrier member 235 releases the holder section 7 of the support member 4 from a state contracted under pressure and restores it to a natural unstressed condition, allowing it to be finally removed from the dummy pin 238. The retraction of the holder member 236 fully separates the support member 4 from its chuck 231. The air cylinder 225 of the frame keeping means 223 is actuated to release said means 223 from the position of keeping the frame 1. The frame 1 is taken out of the frame setting means 203 in a desired form where there are fixed thereto the support member 4 and separate clip. All the above-mentioned operations bring the subject assembling device back to the state which it assumes just before its start.

To the frame 1 thus prepared by welding is again welded a shadow mask by a separate means. The foregoing description relates to the case where there are fixed to the frame 1 three support members 4 and a single separate clip. This is for the reason that the mask assembly is first fitted to the panel by means of the three support members, alignment of the frame with the panel is adjusted by causing a separately provided holder to be held by the clip already fixed to the frame and when exact alignment is attained, the holder is finally welded to the clip, thus assuring that the mask assembly bears a prescribed positional relationship with the panel with greater ease and accuracy than in the case where it is contemplated to initially fix four support members to the frame and thereafter the mask assembly is fitted to the panel.

There has been described a device for welding elastic support members to a shadow mask frame. It will be apparent, however, that the present invention is not limited to such single object and application, but is favorable adapted to fix an elastic material to a base body such as the aforementioned frame. Further, the present invention permits said fixing to be effected for example, by resistance welding, arc welding, or caulking.

According to the foregoing embodiment, the fixing means was fixed. It will be apparent, however, that the fixing means may be brought down from its original position to effect the fixing.

What we claim is:

1. An assembling device for welding a plurality of support members onto a frame, said frame being of the type to which a shadow mask is subsequently welded, said support members supporting said frame in the panel of a color television cathode ray tube, each of said support members consisting of a rigid portion and an elastic portion with the latter portion extending from the rigid portion in an inclined plane and having an aperture formed in the free end comprising:
   means for setting in place said frame;
   means for holding said rigid portions of said support members;
   means for engaging said apertures of said elastic portions of said support members;
   means for moving said engaging means toward said frame set in place together with said holding means;
   means for further moving said engaging means to push towards said frame said elastic portions of said support members even after said rigid portions of said support members held by said holding means contact said frame; and
   means for welding to said frame said rigid portions of said support members brought into contact with said frame.

2. An assembling device according to claim 1 wherein said engaging means is associated with said moving means and is fixed to a movable shaft and slidably disposed upon a guide shaft, said holding means being disposed so as to slide along said movable and guide shafts and to be positioned closer to said frame than said engaging means;
   a resilient member interposed between said engaging and holding means on said movable shaft for enabling said engaging means to be moved further toward said frame by said moving means even after said rigid portions of said support members contact said frame to thereby stop said holding means; and there is further provided means for stopping the movement of said engaging means toward said frame.

3. An assembling device according to claim 2 wherein said resilient member includes a coiled spring wound around said movable shaft.

4. An assembling device according to claim 2 wherein said moving means is an air cylinder.

5. An assembling device according to claim 1 wherein the rigid portions of said support members are welded to said frame one after another.

6. An assembling device according to claim 1 wherein said holding means comprises a fixed plate and a slidable plate arranged to provide a groove there between for receiving and holding the rigid portion of said support member, and spring means for maintaining said slidable plate in position with respect to said fixed plate to define said groove;
   and there is further provided means for moving said slidable plate along said fixed plate against the force of said spring means to release said rigid portion of said support member after said rigid portion is welded to said frame.

7. An assembling device according to claim 1 wherein said engaging means is provided with a truncated cone-shaped pin for engaging the aperture of said support member.

8. An assembling device according to claim 6 wherein said moving means is an air cylinder.

9. An assembling device according to claim 1 further comprising means for varying the relative position of said welding means to said frame setting means.

10. An assembly device according to claim 2 wherein there is further fixed to said movable shaft and positioned nearer to said setting means than said holding means a collar means for moving said holding means back to its original position when said engaging means is also moved back to its original position by said moving means.

* * * * *